US012377373B2

(12) United States Patent
Scott et al.

(10) Patent No.: US 12,377,373 B2
(45) Date of Patent: Aug. 5, 2025

(54) SEPARATOR MONITORING AND CONTROL

(71) Applicant: National Oilwell Varco, L.P., Houston, TX (US)

(72) Inventors: Eric Landon Scott, Conroe, TX (US); Ian Holman, Pearland, TX (US); Muthu Valliappan, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 279 days.

(21) Appl. No.: 17/334,443

(22) Filed: May 28, 2021

(65) Prior Publication Data

US 2021/0379511 A1 Dec. 9, 2021

Related U.S. Application Data

(60) Provisional application No. 63/035,110, filed on Jun. 5, 2020.

(51) Int. Cl.
*B01D 33/80* (2006.01)
*B01D 33/03* (2006.01)
*E21B 21/06* (2006.01)

(52) U.S. Cl.
CPC ....... *B01D 33/806* (2013.01); *B01D 33/0376* (2013.01); *E21B 21/065* (2013.01);
(Continued)

(58) Field of Classification Search
CPC .. B01D 33/806; B01D 33/0376; B01D 33/00; B01D 33/80; B01D 33/03; B01D 33/0346; B01D 2201/48; B01D 2201/54; B01D 2221/04; B01D 21/30; E21B 21/065; E21B 21/06; E21B 44/00; B07B 1/42; B07B 1/55; B07B 1/46; H04N 5/247; G05B 15/02;
(Continued)

(56) References Cited

U.S. PATENT DOCUMENTS

2016/0130928 A1* 5/2016 Torrione ................. G01N 33/24
700/275
2017/0056928 A1* 3/2017 Torrione .................... B07B 1/46
(Continued)

FOREIGN PATENT DOCUMENTS

WO 20160077521 A1 5/2016

OTHER PUBLICATIONS

European Search Report for Corresponding European Application No. 211778550.0 European Search Report dated Oct. 27, 2021, 9 pages.

*Primary Examiner* — Akash K Varma
(74) *Attorney, Agent, or Firm* — Nolte Lackenbach Siegel

(57) ABSTRACT

A system for separating solids from fluids, the system including a separator having a deck having a feed inlet and a solids outlet and a plurality of screens disposed on the deck. Also, an image sensor disposed proximate the solids outlet, the image sensor to capture images of the separator, and send the captured mages to a remote location for analysis. Additionally, a method of monitoring a separator, the method including capturing an image of the separator and sending the image of the separator to a control module disposed at a remote location. The method also including analyzing the image with the control module to determine a separation property and modifying the operation of the separator based on the determined separation property.

18 Claims, 8 Drawing Sheets

(52) U.S. Cl.
CPC ...... *B01D 2201/48* (2013.01); *B01D 2201/54* (2013.01); *B01D 2221/04* (2013.01)

(58) Field of Classification Search
CPC ......... G01C 3/08; G01S 13/58; G01S 13/581; G01F 1/66; G01F 1/663; G01B 21/22
USPC ........................................................ 210/780
See application file for complete search history.

(56) References Cited

U.S. PATENT DOCUMENTS

| | | | | |
|---|---|---|---|---|
| 2017/0056929 | A1* | 3/2017 | Torrione | E21B 21/065 |
| 2018/0355700 | A1* | 12/2018 | Zheng | E21B 44/00 |
| 2019/0368287 | A1* | 12/2019 | Shekhar | G01F 1/663 |

* cited by examiner

SEPARATOR MONITORING AND CONTROL

CROSS REFERENCE TO RELATED APPLICATIONS

The present application claims priority to and the benefit of U.S. Prov. Pat. App. Ser. No. 63/035,110, which was filed on Jun. 5, 2020, which to the extent that it is consistent with the present disclosure is hereby incorporated herein by reference in its entirety.

BACKGROUND

Separators, also sometimes referred to as "shale shakers", are used in drilling operations to separate fluids from solids entrained in a slurry. As a borehole for a well is drilled into a formation, drilling fluids, also referred to as "drill mud" or "drilling mud", is pumped downhole through a drill string to lubricate and cool the drill bit and other downhole equipment. It is also used to remove solids particles, sometimes referred to as "cuttings", from the borehole. As the slurry of drilling fluid and entrained solids is returned to the surface, the slurry is processed to separate and remove the solids from the fluids. Separating the solids and fluids allows fluids to be reused and the solids to be further processed to remove cuttings from drilling fluid additives that may be used in subsequent drilling operations.

Due to the expensive nature of drilling fluids and certain drilling fluid additives, if separating the solids from the fluids is not efficient, the cost of a drilling operation may be substantially increased. As such, drilling operators adjust parameters of the separators used to separate the solids from the fluids in order to reclaim as much valuable drilling fluid and additives as possible. Visual inspection and manual adjustments to separators may result in inefficiencies due to the inconsistent interpretation of the separation process, as well as the relatively slow nature of manually adjusting a separator into an optimal operation condition. These inconsistencies and time-consuming processes thereby result in loss of drilling fluid and fluid additives, which may increase the drilling cost, as well as decrease the profitability of the operation.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Embodiments of the present disclosure may provide image sensors, such as camera systems, disposed proximate separators to capture still and/or video images. The still and/or video images may be used to analyze properties of a slurry as a solid phase is separated from an effluent phase. Based on the slurry properties, aspects of the separator may be adjusted in order to increase the performance of the separator. Increased performance of the separator may thereby allow the solid phase to be separated from the effluent/fluid phase more efficiently, thereby producing a dryer solid phase and/or an effluent phase containing fewer residual solids.

Figure 1:
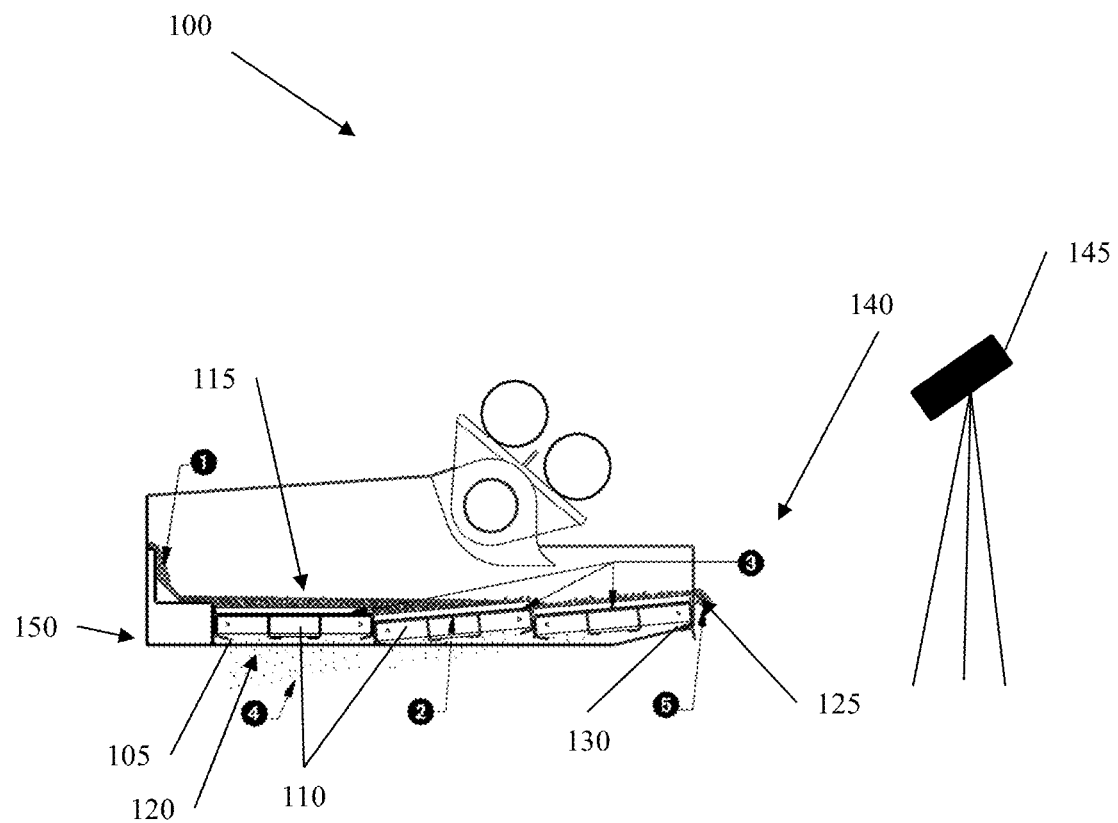
FIG. 1 is a schematic, side view of a separator having a image sensor according to one or more examples of the present disclosure.

Referring to FIG. 1, a schematic, side view of a separator having a image sensor according to one or more embodiments of the present disclosure is shown. In this embodiment, separator 100 includes a deck 105 with multiple screens 110 disposed thereon. As illustrated, separator 100 has three screens 110, however, in other embodiments, separator 100 may have more or less than three screens 110. For example, in certain implementations, a separator may have one, two, four, five, six, or more screens 110. Separators 100 having different configurations, including different numbers of screens 110 are discussed below with respect to FIGS. 2-7.

In operation, a slurry 115 includes a solid phase 125 and an effluent phase 120. The slurry 115 is passed over screens 110, thereby allowing solid phase 125 to be separated from effluent phase 120. The solid phase 125 and may include, for example, solids such as drill cuttings, drilling fluid additives, such as barite, and other types of solids used in drilling operations. Effluent phase 120 may include various drilling fluids, also known as drilling mud. The drilling fluids may include water, oil, synthetic fluids, and/or combinations thereof as well as other kinds of fluids. As slurry 115 passes over screens 110, the effluent phase 120 may pass through the screens 110 for collection in a separator reservoir (not shown) or another holding area that is capable of collecting fluids.

Solid phase 125 traverses deck 105 as the effluent phase 120 falls through the screens 110. This separates, at least to some degree, the effluent phase 120 and the solid phase 125. The solid phase 125 then exits separator 100 at a solids outlet 130. Solids outlet 130 is illustrated as a fall-off point at a distal end 140, i.e., the opposite end of separator 100 from where slurry 115 is introduced. In other embodiments, collection vessels (not shown) may also be used to collect and/or store solid phase 125.

In this embodiment, an image sensor 145 is disposed proximate the distal end 140 of the separator 110. Proximate, in this context, means close enough to the solids outlet 130 to capture an image from which the slurry properties of interest may be determined. Image sensor 145 may be, for example, one of various types of cameras including, but not limited to, video in standard visible spectrum, infrared, radar, laser, microwave, LIDAR, and the like. Image sensor 145 may take one or more of still and/or motion images. As such, image sensor 145 may sense or otherwise capture images from which may be derived one or more slurry properties and output or otherwise send the images including the slurry properties to a remote location, which is discussed in detail below, for analysis.

The image itself is a set of ordered data representing the environment sensed by the image sensor 145 and, in particular, the slurry 115 as it exits the solids outlet 130 of the separator 100. The ordered data may be, but is not necessarily, rendered for human perception, such as by display or reproduction on paper. However, such rendering is not pertinent to the analysis by the control module. As mentioned above, the image may be still or moving. It may be captured using visible light, ultraviolet ("UV") light, infrared, or some other technology suitable for remote sensing that will capture an image amenable to automated processing and analysis. The choice of technology is implementation specific in light of desired operational principles and will affect the implementation of the image sensor 145 in ways that will become apparent to those skilled in the art having the benefit of this disclosure.

Image sensor 145 may be disposed, for example, between three and seven feet from distal end 140 of separator 100. In certain embodiments, image sensor 145 may be disposed between five and six feet from distal end 140 of separator 100. As illustrated, image sensor 145 is not connected to separator 100, and as such, does not experience vibration while separator 100 is in operation. In other embodiments, image sensor 145 may be connected to separator 100 and include a dampening device (not shown) disposed at the connection between image sensor 145 and separator 100. The dampening device may be used to decrease the amount of vibration experienced by image sensor 145 during operation of separator 100.

Image sensor 145 may also be disposed at a height that is between three and seven feet from a base 150 of separator. In certain embodiments, the image sensor 145 height may be between five and six feet. The height of image sensor 145 may further depend on the type of separator that is being monitored. For example, in certain embodiments where separator 100 has a deck 105 that is relatively tall, image sensor 145 may be disposed greater than seven feet, while in embodiments where separator 100 deck 105 is relatively low, image sensor 145 may be disposed less than three feet. In operation, image sensor 145 should have a relatively unobstructed view of distal end 140 of separator, including a fluid endpoint. The fluid endpoint generally occurs about a portion of the second to last screen or about ¾ of the total screen area. In certain embodiments, the fluid endpoint may include a portion of the screening area that includes more than the last screen 110. Additionally, image sensor 145 may be oriented so that more than just the last screen 110 is captured. For example, image sensor 145 may be oriented to include an area several inches past the last screen 110 so that the solids phase 125 discharge may be captured.

In operation, image sensor 145 may capture images that show operational aspects of separator 100 including, for example, properties of slurry 115 as it traverses deck 105. The images may be used to determine separator properties that may affect the operation of separator 100. Examples of properties of the slurry may include location of the slurry, relative location of solid phase 125, relative location of effluent phase 120, size of particles within solid phase 125, fluid endpoint location, and the like. Fluid endpoint refers to the point on the screens 110 where the fluid laden slurry, e.g., slurry 115, ends and beyond which moist solids, e.g., solid phase 125, continue to travel towards solids outlet 130. The fluid endpoint may also be referred to as the "beach position".

If the fluid endpoint is too long, i.e., to distant from solids outlet 130, then the final screens 110 are operating on dryer solids and the life of screen 110 may be shortened. If the fluid endpoint is too short, then the final screens 110 are operating too wet and may discard solids with excess fluids. The loss of fluids may be expensive for an operator in terms of lost base liquid and increased disposal costs. An "optimized" endpoint is one that balances these considerations to achieve a desired level of moistness and fluids in the solid phase 125 as it exits the separator 100.

In certain embodiments, an optimized fluid endpoint may refer to a fluid endpoint that is approximately ¾ of the total length of the screening area. In operation, a relatively long fluid endpoint may be an indicator that separator 100 may be capable of handling greater flow rates or may have finer screens 110 installed. A relatively short fluid endpoint may be an indicator that separator 100 is overloaded. As such, determining the fluid endpoint may allow separator 100 operation to be optimized based on current conditions.

The fluid endpoint may be affected by the amount and properties of slurry 115 on separator 100. The fluid endpoint may also be affected by separator 100 basket angle of inclination, motor speed, and screen 110 mesh size. As such, by measuring the fluid endpoint and comparing that to a desired fluid endpoint, separator 100 may be adjusted, such as by adjusting basket angle of inclination and/or motor speed to maintain the desired fluid endpoint.

In addition to fluid endpoint, other slurry properties and/or separator parameters may be analyzed and/or determined based on images captured by image sensor 145. For example, the images may include solid phase 125 overflow, the size of the solids in solid phase 125, images of screens 110 that allow damage to be detected, screen size and shape, operating hours, presence of foam, changes in the slurry 115 and other such properties and parameters that affect separator 100 performance.

Embodiments of the present disclosure may be used to control separator 100 operation in various ways. For example, embodiments of the present disclosure may allow for a closed-loop control of the fluid endpoint of a single separator 100. Embodiments may also allow closed-loop control of the fluid endpoint of multiple separators 100, solid phase 125 discard management, screen 110 visualization and identification, and the like. Each of the above identified types of control provided through embodiments of separators 100 with image sensors 145 are discussed in detail below.

In one embodiment, image sensors 145 may be used to allow closed-loop control of the fluid endpoint of a single separator 100. In such an embodiment, if multiple separators 100 are in operation, the fluid endpoint of all the separators 100 may be individually adjusted to achieve optimized operation. For example, if the desired fluid endpoint is 18 inches and the measured fluid endpoint is 30 inches, an individual separator 100 may be adjusted to a more downhill position by a small increment. Such adjustment may occur by sending a signal to an actuator to move the orientation of the basked in a more downhill direction. The actuator could include a pneumatic valve (not shown) connected to a bellows (not shown), a linear electrical actuator (not shown), an electrically actuated hydraulic valve connected to a piston (not shown), or similar devices capable of adjusting an angle of a basket.

After a period of time that allows separator 100 to achieve a steady-state and have a stable fluid endpoint, another measurement may be taken. As such, multiple measurements may occur over a period of several seconds, the average of which may result in an updated fluid endpoint based on the adjustments. Thus, if the new measurement is 25 inches, a control signal would again be given to adjust the shaker to a more downhill position. This process may repeat over a selected period of time until the measured fluid endpoint was optimized, e.g., 18 inches, within a tolerance band, e.g., 0.5 inches, etc.

In certain implementations, a separator 100 may not be able to be adjusted any further to achieve an optimized fluid endpoint. In such a circumstance, a signal may be sent that alerts an operator of the condition. In response, an operator could, for example, change a screen size, turn on/off other separators 100, change a motor speed, change a separator 100 motion, etc. Accordingly, by determining a fluid endpoint, automated changes to separator 100 functionality may be controlled, thereby allowing separator 100 operation to be optimized. In certain embodiments, such measuring and adjusting may occur in real-time or substantially real-time. Real-time and/or substantially real-time refers to measuring and adjusting that occurs as operational conditions change, thereby allowing separator 100 functionality to be adjusted within a matter of seconds or minutes. Manual adjustment to separator functionality may not occur in real-time or substantially real-time, and as such, may take longer than the automated adjustments provided by the present disclosure.

In other embodiments, image sensors 145 may be used to allow closed-loop control of the fluid endpoint of multiple separators 100. By capturing and analyzing images using image sensors 145 for multiple separators 100, optimized fluid endpoints for each of the separators 100 may be provided. Because changing the angle of a basket changes the maximum flow rate separator 100 can handle, i.e., separator 100 capacity, such embodiments may expand the range of operating conditions where separators 100 may operate at optimum efficiency. In certain embodiments image sensors 145 may take images, overlay them, and use comparative analysis to determine a condition. In other embodiments, actual measurements may be taken and then compared to a known optimal value. In still other embodiments, software to run the image sensors 145 may be taught what the beach position looks like and then determine how to distinguish the transition between the liquid slurry part and the dryer solids part.

In still other embodiments, image sensors 145 may be used to allow for more effective solid phase 125 discharge management. In such an embodiment, image sensors 145 may be used to estimate and/or measure a volume of solids that are discarded by separator 100. In operation, image sensors 145 may be used to track individual solids, e.g., cuttings, as they traverse deck 105 of separator 100. As such, the speed of travel of the solids may be determined. Such image sensors 145 may include a distance measuring device, or multiple image sensors 145 thereby providing stereo vision, then the solids bed depth may be measured. The solids bed depth refers to the height of all of the solids moving across deck 105 of separator 100.

The measurement of the profile of the solids bed depth and the speed of travel of the solids may be used to determine a solid discard rate. The solids discard rate could thus be calculated for each separator 100 in operation. By taking the integral of the solids discard rate, a total volume of cuttings could be calculated for each separator 100. Such a calculation may thus provide a general indication of individual separator 100 performance, as well as an understanding as to how separators 100 are performing relative to one another. Such a calculation may also allow an operator to know when a drilled hole is returning more solids than normal. Returning more solids than normal may occur if a rheology, i.e., viscosity, of a drilling fluid has increased in order to clean more solids from the drilled hole. In certain embodiments, solids size may also be measured using image sensors 145. Solids size may also provide an indication as to drill bit performance and/or other tools associated with a drilling operation.

In still other embodiments, image sensors 145 may be used to allow for automated measuring of a condition of one or more screens 110. The measurement of the condition of the screens 110 may occur after separator 100 is turned off and after screens 110 have been washed. During operation, separator 100 screens 110 experience wear and may eventually become worn beyond operational limits or experience tears or broken cloth. Damaged cloth (not separately shown) allows larger solids than intended to pass through screens 110 and into the drilling fluid system. Large solids may damage downstream equipment, such as drilling fluid pump liners and downhole motors. Large solids may also turn into many smaller solids that deteriorate drilling fluid, thereby making the drilling fluid less effective in the drilling operation. Image sensors 145 may thus be used to detect damaged cells in screens 110, calculate a percentage of cells on a particular screen 110 that are damaged, record data about screens, and/or alert an operator that one or more screens 110 need to be repaired or replaced.

In certain embodiments, image sensors 145 may also be used to determine and track other information about screens 110. For example, image sensors 145 may be used to determine and/or track screen 110 type, screen 110 mesh size, operating hours of individual screens 110, the number of screens 110 used for a particular well, the number of screens 110 used based on feet drilled per time increment, screen 100 make/model, and the like.

Embodiments of the present disclosure may also be used to optimize separator parameters based on changing conditions of a drilling fluid, slurry 115, drilling operation, drilling equipment, etc. Additional embodiments and methods of operation are discussed in detail below with respect to FIGS. 2-9.

Figure 2:
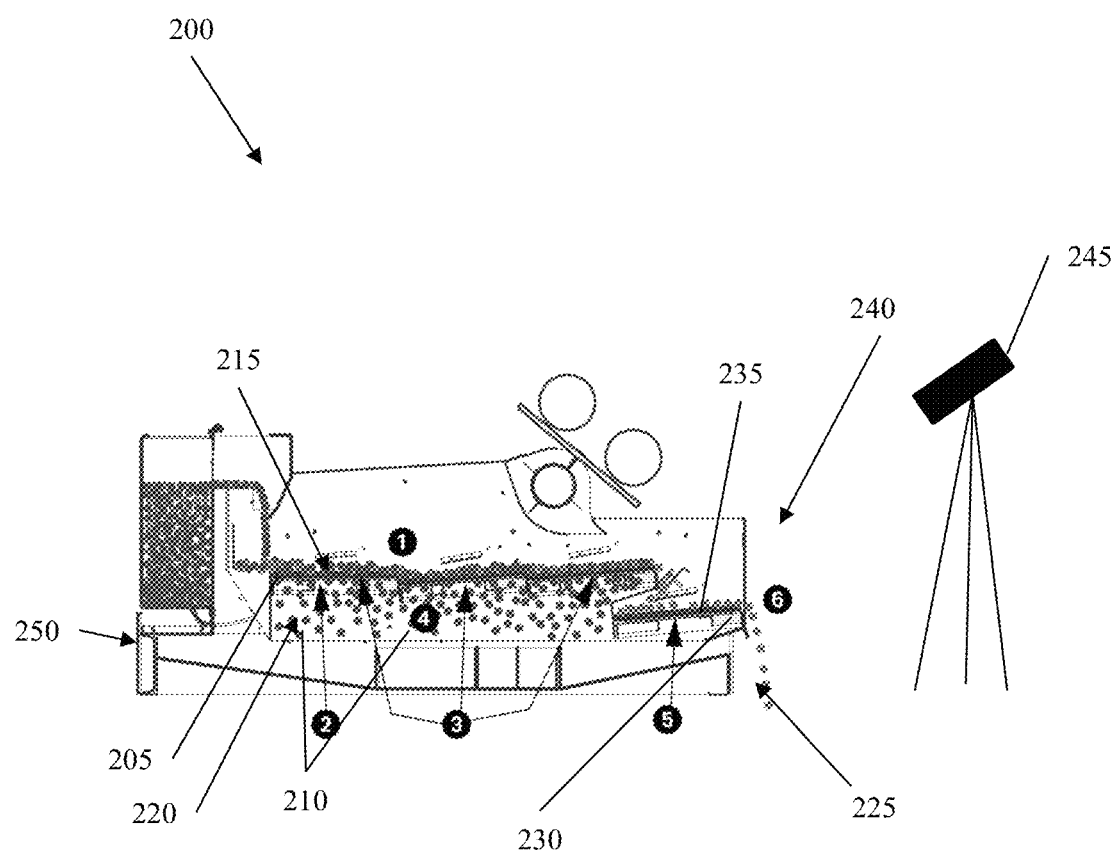
FIG. 2 is a schematic, side view of a separator having a image sensor according to one or more examples of the present disclosure.

Referring to FIG. 2, a side view of a separator having an image sensor according to one or more embodiments of the present disclosure is shown. In this embodiment, separator 200 includes a deck 205 with multiple screens 210 disposed thereon. As illustrated, separator 200 has four screens 210, however, in other embodiments, separator 200 may have more or less than four screens 210.

In operation, a slurry 215 is passed over screens 210, thereby allowing solids to be separated from an effluent phase 220. As slurry 215 passes over screens 210, the effluent phase 220 may pass through the screens 210 for collection in a separator reservoir (not shown) or another holding area that is capable of colleting fluids. Solid phase 225 traverses deck 205 and exits separator 200 at a solids outlet 230. Solids outlet 230 is illustrated as a fall-off point at a distal end 240 of separator 200.

In operation, separator 200 functions similar to separator 100 of FIG. 1. However, separator 200 includes a drying screen 235 located at distal end 240. Drying screen 235 may be used to remove residual effluent phase 220 from solids before the solids are discharged from separator 200.

In this embodiment, image sensor 245 is disposed proximate separator 200 distal end 240. As such, image sensor 245 may sense or otherwise capture images that include aspects of one or more slurry properties and output or otherwise send the images including the images showing certain slurry properties to a remote location. For brevity, image sensor 245 may be oriented and function as discussed above with respect to FIG. 1. In this orientation, image sensor 245 may be disposed around the third screen, near distal end 240, or at another location that provides for image capturing as solids are discarded.

Figure 3:
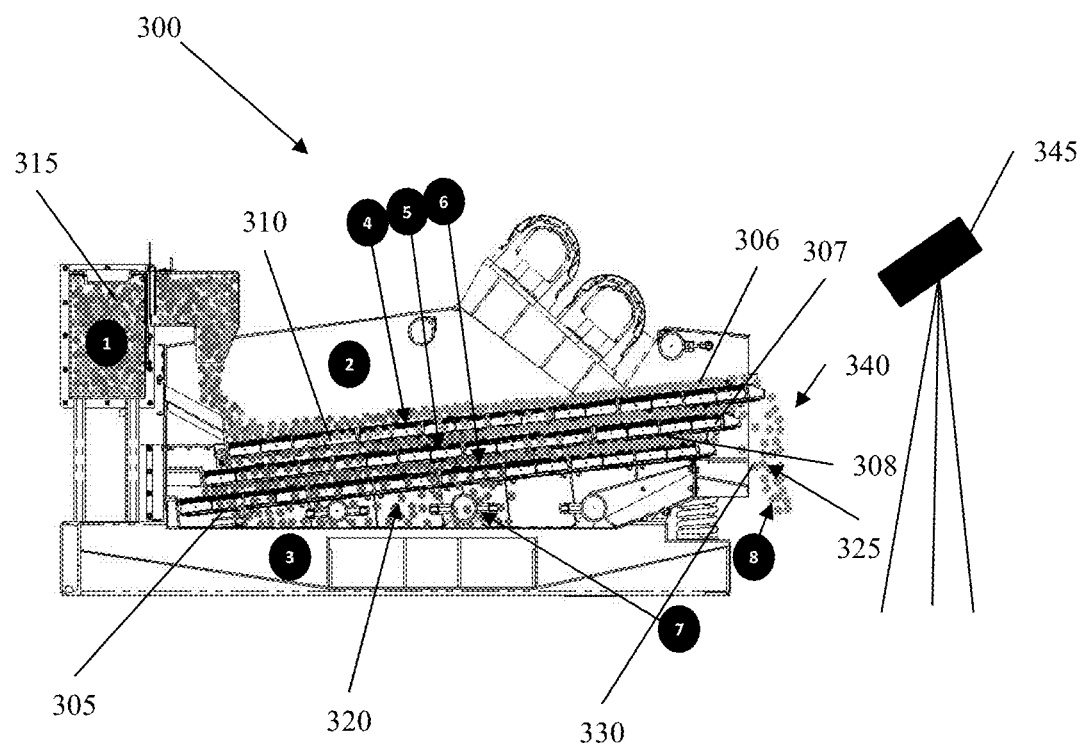
FIG. 3 is a schematic, side view of a separator having a image sensor according to one or more examples of the present disclosure.

Referring to FIG. 3, a side view of a separator having an image sensor according to one or more embodiments of the present disclosure is shown. In this embodiment, separator 300 includes a basket assembly 305 with multiple screens 310 disposed on a number of decks. Basket assembly 305 includes an upper screen deck 306, a middle screen deck 307, and a lower screen deck 308.

In operation, a slurry 315 is passed over screens 310, thereby allowing a solid phase 325 to be separated from an effluent phase 320. As slurry 315 passes over screens 310, the effluent phase 320 may pass through the screens 310 for collection in a separator reservoir (not shown) or another holding area that is capable of collecting fluids. Solid phase 325 traverses deck 305 and exits separator 300 at a solids outlet 330. Solids outlet 330 is illustrated as a fall-off point at a distal end 340 of separator 300.

In this embodiment, image sensor 345 is disposed proximate separator 300 distal end 340. As such, image sensor 345 may sense or otherwise capture images that include aspects of one or more slurry properties and output or otherwise send the images including the slurry properties to a remote location. For brevity, image sensor 345 may be oriented and function as discussed above with respect to FIG. 1. In this orientation, image sensor 345 may be focused on the solids as they fall off separator 300.

Figure 4:
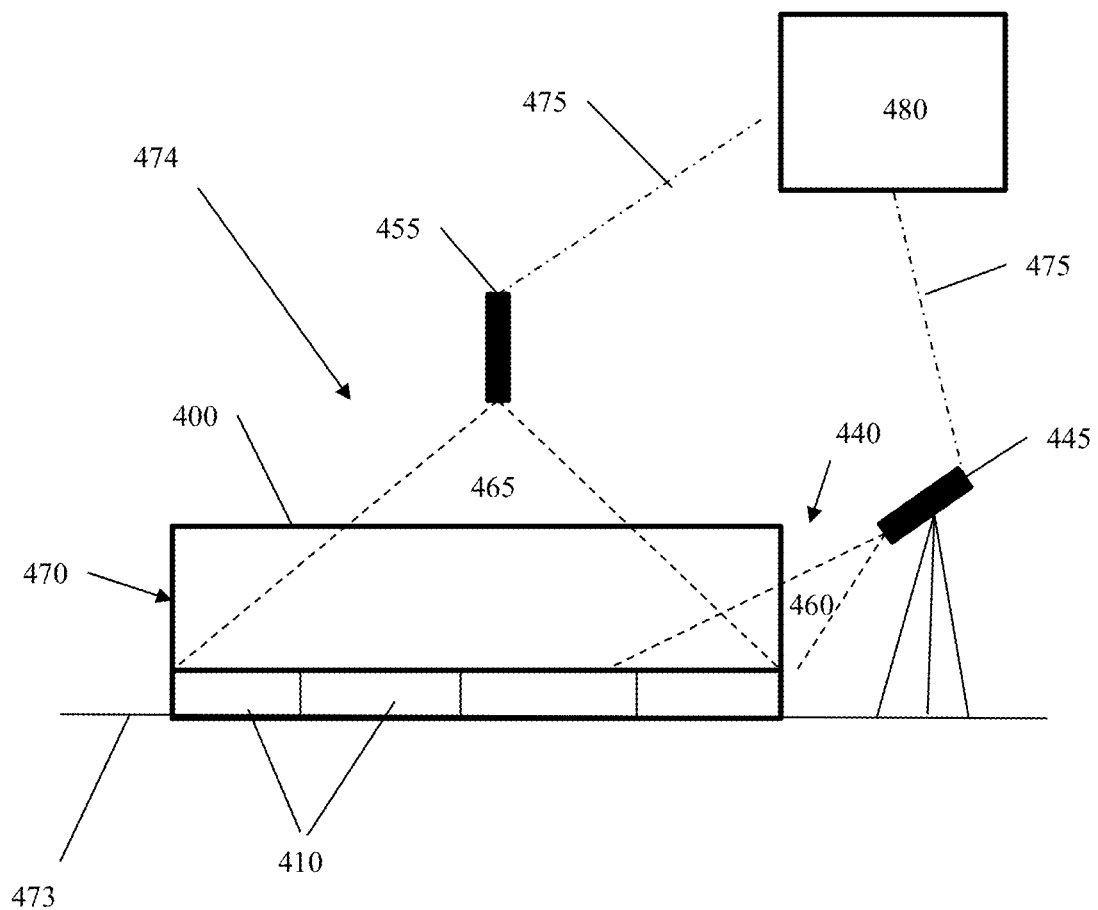
FIG. 4 is a schematic, side view of a separator having a image sensor connected to a remotely located control module according to one or more examples of the present disclosure.

Referring to FIG. 4, a side view of a separator having an image sensor connected to a remotely located control module, according to one or more embodiments of the present disclosure is shown. In this embodiment, separator 400 is schematically represented having a first image sensor 445 disposed at a distal end 440. A second image sensor 455 may also be disposed proximate a side or above separator 400. Second image sensor 455 may be oriented to the side and/or above separator 400, thereby allowing second image sensor 455 to capture additional information about separator 400, screens 410, a slurry, etc.

As illustrated first image sensor 445 may be oriented to capture information from distal end 440 of separator, as illustrated with viewing angle 460. As such, first image sensor 445 may function as discussed above with respect to FIGS. 1-3. Second image sensor 455 may be oriented to capture information from a top and/or side of separator 400, as illustrated with viewing angle 465. As such, second image sensor 455 may provide a view of the entire top portion of separator 400 or a subset of the top portion of separator 400. The additional viewing angle 465 provided by second image sensor 455 may thereby allow additional slurry properties to be identified, such as information available at a feed inlet 470 of separator 400. Information from feed inlet 470 may include, for example, information from a feed system, slurry pond, slurry feed rate, original condition of the slurry, etc.

Separator 400 and first image sensor 445 are shown disposed on a skid 473. Second image sensor 455 may also be disposed on skid 473 or may alternatively be disposed on another apparatus attached to skid 473, such as a boom (not shown) that allows second image sensor 455 to be moved around different locations relative to separator 400. For example, second image sensor 455 may be moved from a side of separator 400 to above separator 400 and may also be adjusted to different heights and/or orientations. First image sensor 445 and/or second image sensor 455 may be disposed on skid 473 to prevent the vibration of separator 400 from affecting the quality of the images that are captured by first image sensor 445 and/or second image sensor 455. Collectively, separator 400 and first image sensor 445 and/or second image sensor 455 disposed on skid 473 may be referred to as a separation assembly 474.

Both first image sensor 445 and second image sensor 455 are operationally connected 475 to a control module 480 disposed at a remote location. The connection 475 between first image sensor 445 and second image sensor 455 may be wired or wireless and may include, for example, WiFi® connection, radio frequency connections, Bluetooth® connections, near field connections, and the like. As such, as first image sensor 445 and second image sensor 455 sense slurry properties and/or separator 400 parameters and/or collect data, such as images, from separator 400, the sensed information may be sent to control module 480 for analysis.

As indicated above, control module 480 is located remote from separator 400. The remote location refers to a location where analysis is performed that is separate from where the images are collected. Said another way, the information is analyzed at a different location than on separator 400. A remote location may refer to, for example, an on-rig control and/or processing area, an off-rig management center, by an operator located at a different rig, and/or other areas removed from separator 400.

In still other embodiments, additional image sensors or other orientations of image sensors may be provided. For example, in one implementation a single image sensor may be used, disposed at distal end 440, along a side of separator 400, above a separator 400, or at a feed inlet 470 of separator 400. In other implementations, multiple image sensors may be disposed at one or more locations about separator 400, such as those locations discussed above. In still other implementations, more than one or two image sensors may be used. For example, three, four, or more image sensors may be disposed at various locations about separator 400.

In certain embodiments employing more than one image sensor, each image sensor may be substantially the same, e.g., each image sensor may capture the same type of information. In other embodiments, each image sensor may be different, e.g., one image sensor may capture images in the visual spectrum, while another image sensor may capture infra-red. In still other embodiments, where more than one image sensor is employed, both image sensors may be located at the same location about separator 400, i.e., both disposed at distal end 440; however, each image sensor may be used to collected different information. Similarly, in embodiments where more than one image sensor is employed, the image sensors may be disposed to capture information from different locations about separator 400.

Figure 5:
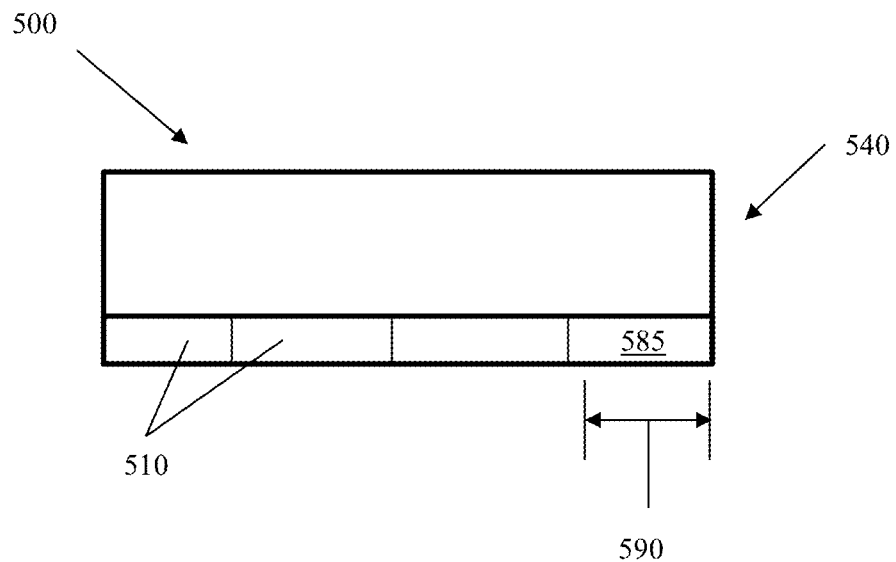
FIG. 5 is a schematic, side view of a separator according to one or more examples of the present disclosure.

Referring to FIG. 5, a side view of a separator, according to one or more embodiments of the present disclosure is shown. In this embodiment, a separator 500 is illustrated having four screens 510 (only two indicated). A last/final screen 585 is disposed at a distal location 540 of separator 500. An image sensor (not shown) may be oriented, as discussed above, about distal end 540, thereby be capable of capturing information from last/final screen 585.

In this example, a fluid endpoint 590 is illustrated. As explained above, fluid endpoint 590 refers to the line where the fluid laden slurry ends and beyond which moist solids continue to travel towards solids outlet 530. Fluid endpoint 590 may change over time due to operational changes that occur at the drilling rig. Also as discussed above, the fluid endpoint 590 may be used to access the operational conditions of separator 500, the drilling operation, drilling equipment, and the like. As such, maintaining an optimum fluid endpoint 590 may be used increase the efficiency of the separatory operation.

Figure 6:
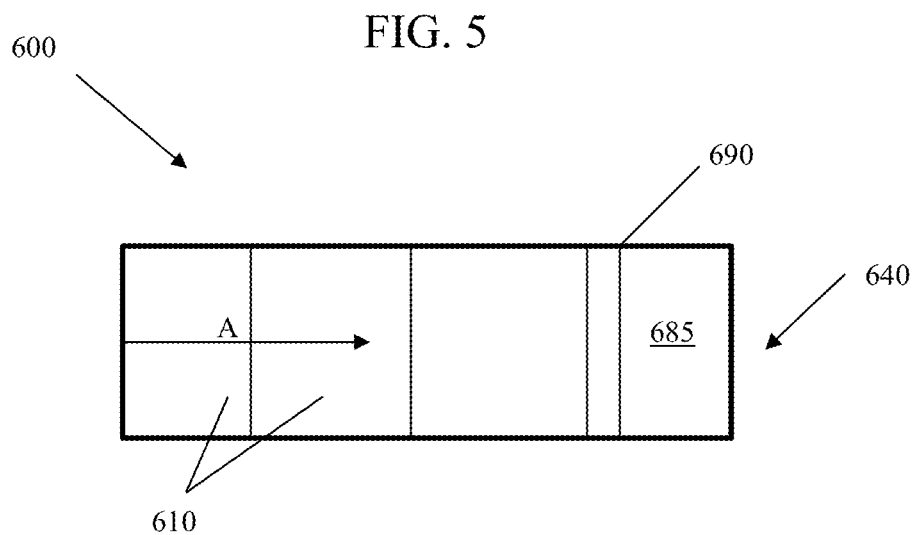
FIG. 6 is a schematic, top view of a separator according to one or more examples of the present disclosure.

Referring to FIG. 6, a top view of a separator, according to one or more embodiments of the present disclosure is shown. In this embodiment, a separator 600 is illustrated having four screens 610 (only two indicated). A last/final screen 685 is disposed at a distal location 640 of separator 600. An image sensor (not shown) may be oriented, as discussed above, about distal end 40, and thereby be capable of capturing information from last/final screen 685.

As with FIG. 5, FIG. 6 illustrates a fluid endpoint 690. As a slurry traverses separator 600 in direction A, fluid endpoint 690 may move. For example, fluid endpoint 690 in an optimized location may occur 20 inches from distal end 640. However, in operation, fluid endpoint 690 may be located less than 20 inches or more than 20 inches from distal end 640. In such occurrences, knowing the actual fluid endpoint 690 compared to the optimized fluid endpoint 690 may allow operational aspects, such as basket angle and/or motor speed, to be adjusted to cause fluid endpoint 690 to move closer to the optimized fluid endpoint 690. Methods for adjusting such operational aspects of separator 600 may include those discussed in detail above with respect to FIG. 1.

Figure 7:
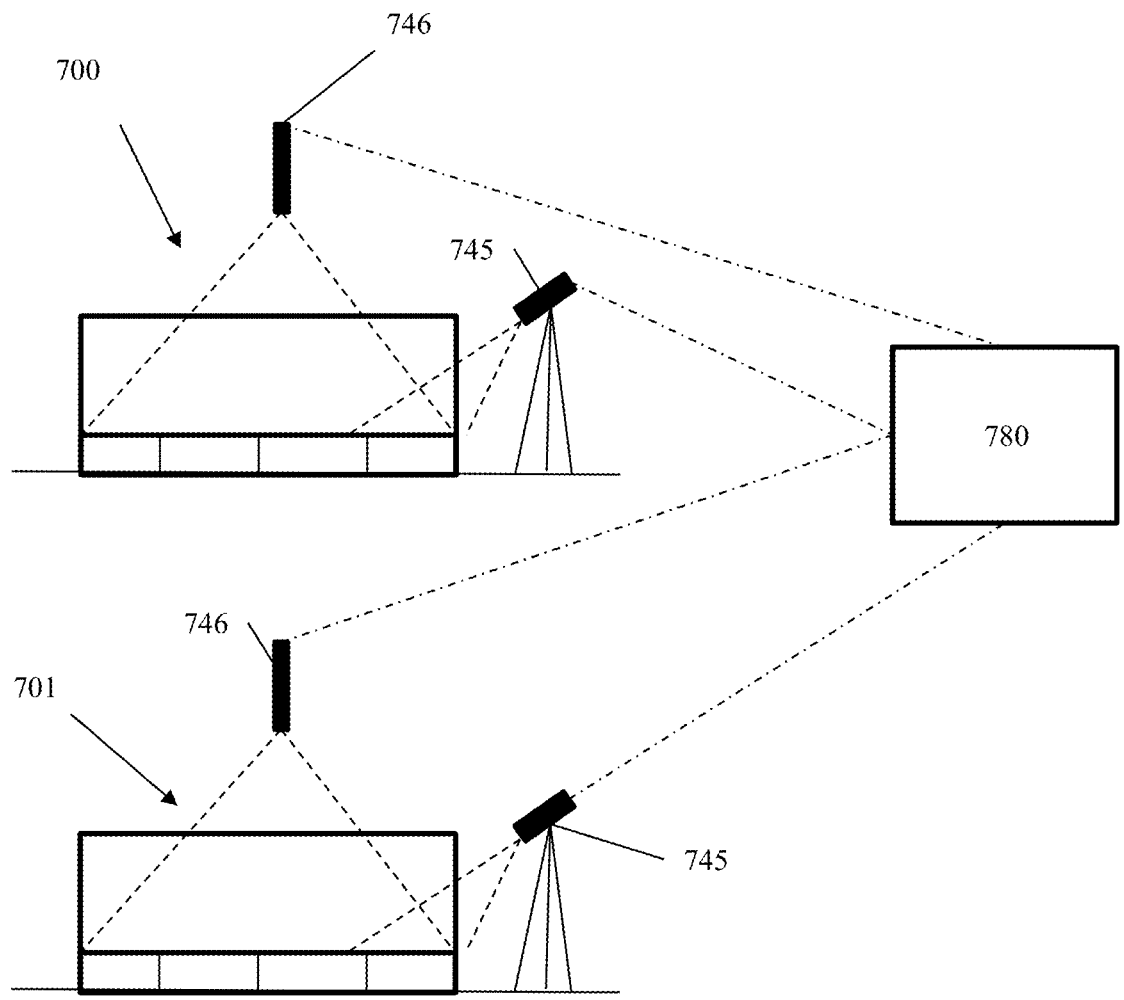
FIG. 7 is a schematic representation of multiple separators connected to a remotely located control module according to one or more examples of the disclosure.

Referring to FIG. 7, a schematic representation of multiple separators connected to a remotely located control module, according to one or more embodiments of the present disclosure is shown. In operation, a drilling location may have multiple separators 700/701. While two separators 700/701 are shown, in operation, drilling operations may have more than two separator 700/701, such as three, four, five, or more, depending on the operational requirements of the drilling rig.

As illustrated, each separator 700/701 includes image sensors 745/746, respectively, such as the image sensors 745/746 discussed above with respect to FIG. 1-4. Image sensors 745/746 capture slurry properties and/or separator parameters from separators 700/701 and send such captured properties/parameters to a control module 780, that is located remote from separators 700/701. Control module 780 may thereby use the captured information and send control signals to one or more of separators 700/701. For example, control module 780 may turn off or turn on one or more of separators 700/701 in response to a change in a condition, such as a fluid endpoint, of a slurry on one or more of separators 700/701.

The captured information may also be analyzed by control module 780 to determine if equipment associated with one or more of separators 700/701 is damaged or not operating as expected. This information may be used, through control signals, to adjust a property of one or more of separators 700/701 and/or may be used to alert an operator as to the condition of separators 700/701.

Figure 8:
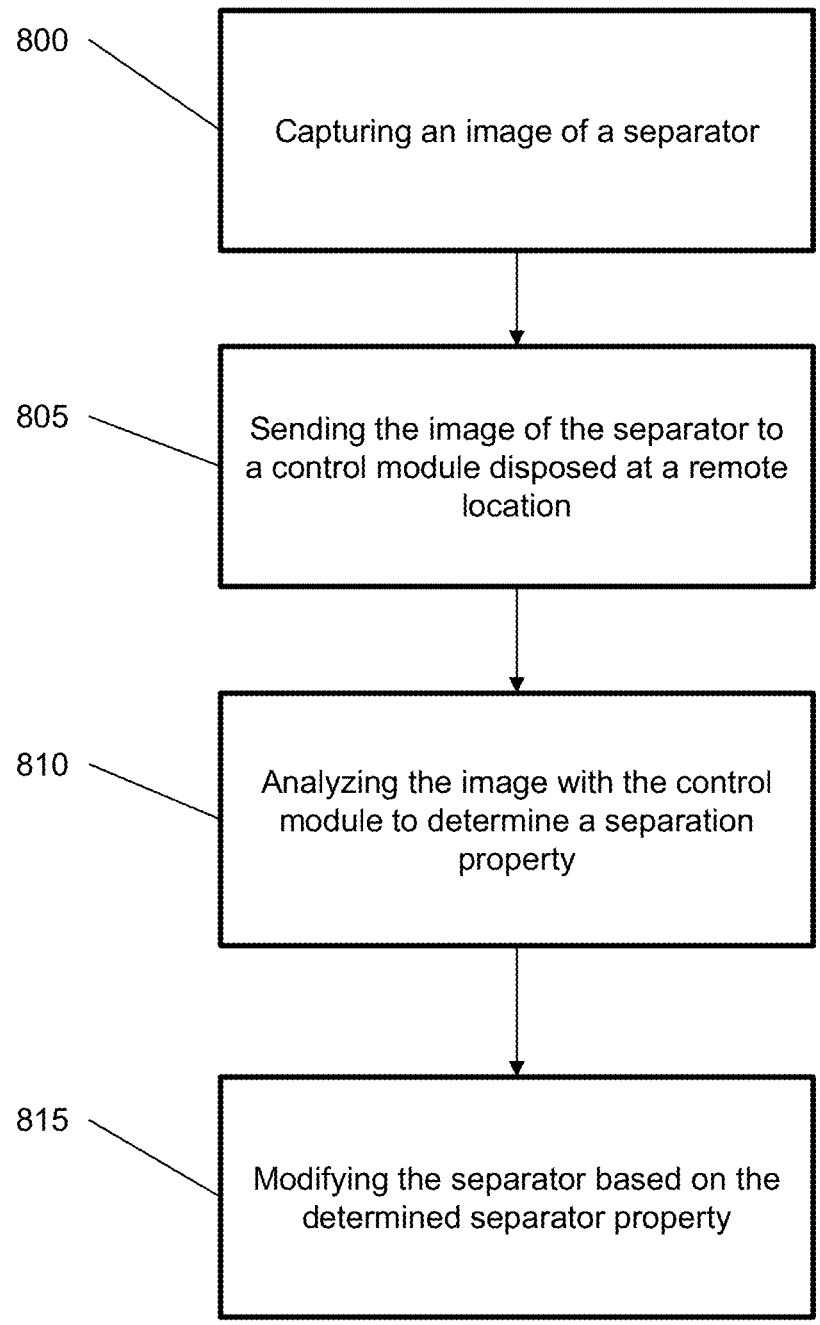
FIG. 8 is a flow chart of a method of monitoring a separator according to one or more examples of the disclosure.

Referring to FIG. 8, a flow chart of a method of monitoring a separator according to one or more embodiments of the present disclosure is shown. In operation, the method includes capturing (block 800) an image of a separator. Capturing the image may include taking still shots or video through one of a number of visual or non-visual spectra, as discussed in detail above. The image may further include a plurality of images, where each image is of the same spectrum or the images are of different spectra, e.g., a first image may be in one spectrum while a second image is in a second, different spectrum. Capturing the image may further include taking a plurality of images over a set time sequence. For example, images could be taken substantially consistently or video could be substantially constantly recorded. In other examples, images may be taken every second, every 15 second, every minute, every several minutes, or according to a schedule defined by an operator. Images may also be taken on an as needed basis, as may occur when trying to identify damage to a screen, which may occur when the separator is off and has been washed. Thus, in certain examples, images may be captured while the separator is operating, while in other embodiments images may be captured while the separator is not operating.

In operation, the method further includes sending (block 805) the image of the separator to a control module disposed at a remote location. The control module may include a computer system or computing device, such as will be discussed in detail with respect to FIG. 9. The image may be sent individually, or batches of images may be sent, where the batches of images include at least two images. The images may be sent over wired or wireless connections and may be sent as they are taken or according to a defined time sequence. For example, images may be sent to the control module as soon as they are captured by a image sensor. In another example, the image sensor may include a storage device that allows a number of images to be captured, stored, and then sent to the control module when a certain number of images have been captured or, for example, every second, 10 seconds 15 seconds, 30 seconds, every minute, etc.

In operation, the method further includes analyzing (block 810) the image with the control module to determine a separation property. The separation property may include, for example, a slurry property and/or a separator parameter, such as those discussed above. The separation property may further include a functional aspect of the separator, while the separator is in operation. Examples of such separation properties may include, for example, a fluid endpoint, a screen parameter, a solid discharge rate, a solid speed, a solids overflow volume, a solid size, a solid distribution, a separator capacity, etc. Examples of screen parameters may include make, model, mesh size, condition, operating hours, i.e., time in use, etc. Additional properties may include, for example, rate of penetration, mud pump rate, fluid type, hold size, depth, total vertical depth, formation type, drilling rig operational status, etc.

In operation, the method further includes modifying (block 815) the separator based on the determined separation property. Modifying may include changing an operational aspect of the separator or changing an operational parameter of one separator relative to another. Examples of modifying a separator may include adjusting a basket angle, adjusting a motor speed, changing a screen, repairing a screen, turning a separator on, turning a separator off, adjusting a feed rate of a slurry, adjusting a screen mesh size, adjusting a flow weir, isolating a separator, adjusting a valve position, e.g., between open/closed and/or a position therebetween, changing a motion, e.g., between linear and elliptical, etc.

The modifying may occur automatically in response to the analyzing. For example, if a specific separation property is determined, a specific modification may be preprogrammed into control module. As such, control module may automatically make an adjustment to a separator when the specific separation property is identified. As such, the modification to the separator may occur in real-time or substantially in real-time, as discussed above. In still other embodiments, rather than automatically make the adjustment, the control module may send an alert to an operator about the condition of a separator. The alert may be visual, such as a display on a monitor, computer, tablet, phone, etc., or may be auditory, in the form of an alarm or other signal.

In certain embodiments, the control module may include or have access to machine learning, such as deep machine learning in the form of, for example, artificial neural networks. Examples of types of artificial neural networks that may be used include convolutional, recursive, recurrent, sequence-to-sequence, shallow, multilayer, etc. In such embodiments, the artificial neural networks may be trained with conditions that allow separation property to be determined quickly, without the need for time consuming measurements or calculations. As such, control modules using artificial neural networks may be capable of predicting when a separation property is likely to occur and take preemptive action. Such preemptive action may include modifying a separator or otherwise alerting an operator that a specific condition is likely to occur. Because such control modules may include predictive logic, the control modules may be used to forecast operational conditions of a separator or other equipment in a drilling operation.

In operation, certain information may be inputted into control module because control module is used for a particular separator. Examples of information that may be inputted may include screen parameters, basket angle, motor speed, type of drilling fluid, type of drilling rig, type of drill bit, expected solids size, type or types of image sensors, number of image sensors, rate of image capture, rate of image receipt, hours in operation, information from drilling fluid reports, etc. Additional information may also be provided to control module during a drilling/separation operation. The additional information may include, for example, weight on bit, revolutions per minute of a drill bit, reamer, or the like, formation data, depth of hole, size of hole, type of solids, e.g., formation type, type of drilling fluid, type of separator motion, g-force of separator motion, amount of side-to-side motion of a separator, number of separators in use, number of separators at a drilling site, etc.

Information may also be provided to an operator. Examples of information that may be output to a user may include, fluid endpoint, separator efficiency, hours in use, separator loading, health of separator, health of screens, cost analysis, volumes of solids discharged, volume of solids per screen, health of separator over time, drilling rig status, drill bit health, separator operational status, e.g., on/off/fault, etc.

Figure 9:
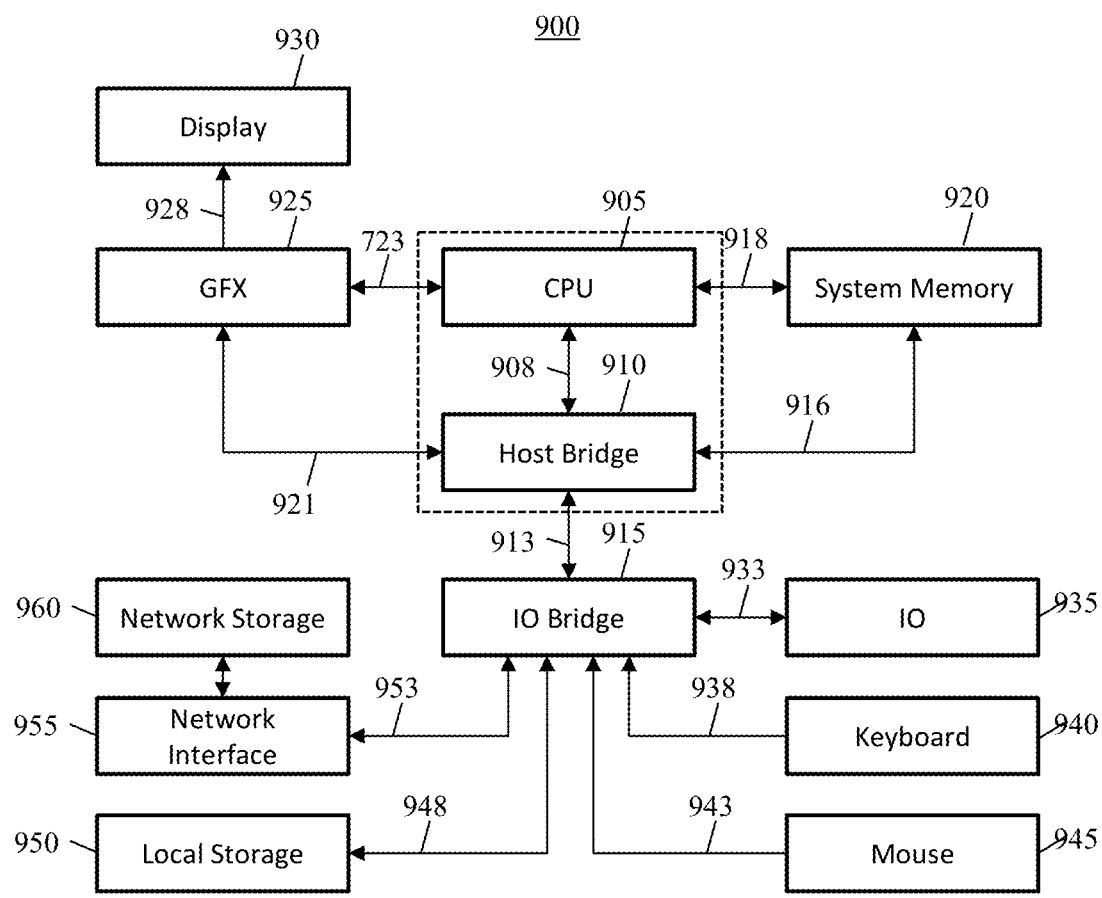
FIG. 9 is a computer system that may be used in design optimization for choke valves and choke valve components according to one or more examples of the disclosure.

Referring to FIG. 9, a schematic representation of a computer processing device 900 that may be used to implement functions and processes in accordance with one or more examples of the present disclosure is shown. For example, such computer processing device 900 may be used to perform the analyzation of the images captured by the image sensors, as described above. Such computer processing devices 900 may also be used to run or train artificial neural networks or other deep machine learning logic. In certain implementations, computer processing devices 900 may be low power computation systems that perform calculations based on captured images and/or send or receive control signals for adjusting aspects of one or more separators. FIG. 9 illustrates a computer processing device 900 that may be used to implement the systems, methods, and processes of this disclosure. For example, computer processing device 900 illustrated in FIG. 9 could represent a client device or a physical server device and include either hardware or virtual processor(s) depending on the level of abstraction of the computing device. In some instances (without abstraction), computer processing device 900 and its elements, as shown in FIG. 9, each relate to physical hardware. Alternatively, in some instances one, more, or all of the elements could be implemented using emulators or virtual machines as levels of abstraction. In any case, no matter how many levels of abstraction away from the physical hardware, computer processing device 900 at its lowest level may be implemented on physical hardware.

More particularly, computer processing devices such as the computer processing device 900 may be used to implement the control module, such as the control module 480 in FIG. 4 and control module 780 in FIG. 7. In general, the control modules 480, 780 may be implemented in hardware, software, or a combination of hardware and software. For example, a control module may be implemented in an Electrically Erasable, Programmable, Read-Only Memory ("EEPROM"), an Application Specific Integrated Circuit ("ASIC"), or a processing resource executing instructions stored in a non-transitory computer readable memory.

FIG. 9 shows a computer processing device 900 in accordance with one or more examples of the present disclosure. Computer processing device 900 may be used to implement aspects of the present disclosure, such as processing images, analyzing slurry properties, determining separator parameters, displaying slurry properties and/or separator parameters, and the like. Computer processing device 900 may include one or more central processing units (singular "CPU" or plural "CPUs") 905 or other kinds of processing resources such a graphics processors or processor chipsets. Processor chipsets may include, for example, a general CPU, a graphics co-processor, a math co-processor, etc. and various combinations thereof.

The CPU(s) 905 may be disposed on one or more printed circuit boards (not otherwise shown). Each of the one or more CPUs 905 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computer processing device 900 may include one or more core logic devices such as, for example, host bridge 910 and input/output ("IO") bridge 915.

CPU 905 may include an interface 908 to host bridge 910, an interface 918 to system memory 920, and an interface 923 to one or more IO devices, such as, for example, graphics processing unit ("GFX") 925. GFX 925 may include one or more graphics processor cores (not independently shown) and an interface 928 to display 930. In certain examples, CPU 905 may integrate the functionality of GFX 925 and interface directly (not shown) with display 930. Host bridge 910 may include an interface 908 to CPU 905, an interface 913 to IO bridge 915, for examples where CPU 905 does not include interface 918 to system memory 920, an interface 916 to system memory 920, and for examples where CPU 905 does not include integrated GFX 925 or interface 923 to GFX 925, an interface 921 to GFX 925. One of ordinary skill in the art having the benefit of this disclosure will recognize that CPU 905 and host bridge 910 may be integrated, in whole or in part, to reduce chip count, motherboard footprint, thermal design power, and power consumption. IO bridge 915 may include an interface 913 to host bridge 910, one or more interfaces 933 to one or more IO expansion devices 935, an interface 938 to keyboard 940, an interface 943 to mouse 945, an interface 948 to one or more local storage devices 950, and an interface 953 to one or more network interface devices 955.

Each local storage device 950 may be a solid-state memory device, a solid-state memory device array, a hard disk drive, a hard disk drive array, or any other non-transitory computer readable medium. Each network interface device 955 may provide one or more network interfaces including, for example, Ethernet, Fibre Channel, WiMAX, Wi-Fi®, Bluetooth®, or any other network protocol suitable to facilitate networked communications. Computer processing device 900 may include one or more network-attached storage devices 960 in addition to, or instead of, one or more local storage devices 950. Network-attached storage device 960 may be a solid-state memory device, a solid-state memory device array, a hard disk drive, a hard disk drive array, or any other non-transitory computer readable medium. Network-attached storage device 960 may or may not be collocated with computer processing device 900 and may be accessible to computer processing device 900 via one or more network interfaces provided by one or more network interface devices 955.

One of ordinary skill in the art having the benefit of this disclosure will recognize that computer processing device 900 may include one or more application-specific integrated circuits ("ASICs") that are configured to perform a certain function, such as, for example, hashing (not shown), in a more efficient manner. The one or more ASICs may interface directly with an interface of CPU 905, host bridge 910, or IO bridge 915. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 905, host bridge 910, IO bridge 915, or ASICs or various sub-sets, super-sets, or combinations of functions or features thereof, may be integrated, in whole or in part, or distributed among various devices in a way that may vary based on an application, design, or form factor in accordance with one or more example examples. As such, the description of computer processing device 900 is merely exemplary and not intended to limit the type, kind, or configuration of components that constitute a computing system suitable for performing computing operations, including, but not limited to, hashing functions. Additionally, one of ordinary skill in the art will recognize that computer processing device 900, an application-specific computing system (not shown), or combination thereof, may be disposed in a stand-alone, desktop, server, or rack mountable form factor.

One of ordinary skill in the art will recognize that computer processing device 900 may be a cloud-based server, a server, a workstation, a desktop, a laptop, a netbook, a tablet, a smartphone, a mobile device, and/or any other type of computing system in accordance with one or more example examples.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic, e.g., a floppy disk or a hard drive or optical, e.g., a compact disk read only memory, or "CD ROM", and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A system for separating solids from fluids, the system comprising:
    a separator comprising:
        a deck having a feed inlet and a solids outlet; and
        a plurality of screens disposed on the deck;

an image sensor disposed proximate the solids outlet, the image sensor to:
capture images of the separator; and
send the captured images to a remote location that is separate from where the images are collected and different from a location of the separator for analysis.

2. The system of claim 1, wherein a plurality of slurry properties are sent to the remote location in real-time.

3. The system of claim 1, wherein the image sensor is disposed above the solids outlet.

4. The system of claim 1, further comprising a skid on which the separator and the image sensor are disposed.

5. The system of claim 1, wherein the remote location comprises a control module to process the captured images and calculate a solids overflow volume.

6. The system of claim 1, wherein the remote location comprises a control module to determine a fluid endpoint of the separator when the separator is operating.

7. The system of claim 1, wherein the remote location comprises a control module to identify a cuttings size distribution.

8. The system of claim 1, wherein the remote location comprises a control module to determine an integrity of at least one of the plurality of screens.

9. The system of claim 1, further comprising a second image sensor disposed proximate a side of the deck.

10. A method of monitoring a separator including a deck having a feed inlet and a solids outlet and a plurality of screens disposed on the deck, the method comprising:
disposing an image sensor proximate the solids outlet of the separator;
capturing images of the separator; and
sending the captured images to a remote location that is separate from where the images are collected and different from a location of the separator for analysis.

11. The method of claim 10, further comprising sending a plurality of slurry properties to the remote location in real-time.

12. The method of claim 10, wherein disposing the image sensor proximate the solids outlet includes disposing the image sensor above the solids outlet.

13. The method of claim 10, wherein disposing the image sensor proximate the solids outlet includes disposing the image sensor on a skid on which the separator is disposed.

14. The method of claim 10, wherein:
the remote location comprises a control module; and
the method further comprises:
processing the captured images by the control module at the remote location; and
calculating a solids overflow volume from the processed captured images by the control module at the remote location.

15. The method of claim 10, wherein:
the remote location comprises a control module; and
the method further comprises:
processing the captured images by the control module at the remote location; and
determining a fluid endpoint of the separator when the separator is operating by the control module from the processed captured images.

16. The method of claim 10, wherein:
the remote location comprises a control module; and
the method further comprises processing the captured images by the control module at the remote location to identify a cuttings size distribution.

17. The method of claim 10, wherein:
the remote location comprises a control module; and
the method further comprises;
processing the captured images by the control module at the remote location to determine an integrity of at least one of the plurality of screens.

18. The method of claim 10, further comprising disposing a second image sensor proximate a side of the deck.

* * * * *